United States Patent
Akyildiz

(10) Patent No.: US 10,302,182 B2
(45) Date of Patent: May 28, 2019

(54) FIXING AND ACTUATING MECHANISM WITH SPIRAL BALL CHANNEL

(71) Applicant: Katek Endustriyel Tasarim Teknik Danismanlik Sanayi Ve Ticaret Limited Sirketi, Istanbul (TR)

(72) Inventor: Kerim Akyildiz, Istanbul (TR)

(73) Assignee: KATEK ENDÜSTRIYEL TASARIM TEKNIK DANISMANLIK SANAYI VE TICARET LIMITED SIRKETI, Istanbul (TR)

(*) Notice: Subject to any disclaimer, the term of this patent is extended or adjusted under 35 U.S.C. 154(b) by 0 days.

(21) Appl. No.: 15/102,245

(22) PCT Filed: Dec. 6, 2013

(86) PCT No.: PCT/TR2013/000374
§ 371 (c)(1),
(2) Date: Sep. 9, 2016

(87) PCT Pub. No.: WO2015/084273
PCT Pub. Date: Jun. 11, 2015

(65) Prior Publication Data
US 2016/0305518 A1    Oct. 20, 2016

(51) Int. Cl.
*F16H 25/20* (2006.01)
*F16H 25/22* (2006.01)
*F16H 25/24* (2006.01)

(52) U.S. Cl.
CPC ..... *F16H 25/2214* (2013.01); *F16H 25/2003* (2013.01); *F16H 25/2427* (2013.01)

(58) Field of Classification Search
CPC .................................................. F16H 25/2214
See application file for complete search history.

(56) References Cited

U.S. PATENT DOCUMENTS

| 438,320 | A | * | 10/1890 | Lieb .................... F16H 25/2228 188/129 |
| 782,347 | A | * | 2/1905 | Lidback ................. F16C 31/06 74/424.82 |

FOREIGN PATENT DOCUMENTS

| TR | 2012/01188 A2 | 10/2012 |
| WO | 2013/115735 A2 | 8/2013 |

OTHER PUBLICATIONS

International Search Report for Application No. PCT/TR2013/000374, dated Aug. 7, 2014 (2 pages).

* cited by examiner

*Primary Examiner* — Terence Boes
(74) *Attorney, Agent, or Firm* — Womble Bond Dickinson (US) LLP; John J. Penny, Jr.

(57) ABSTRACT

The present invention is related to a fixing and actuating mechanism with a spiral ball channel which is designed as the square and trapezoidal screws or rectangular or particularly coiled springs in different shapes which are produced in the sensitivity that can work in the system to perform the function of converting rotational movement into linear movement similar to the relationship of a screw and square nut and is performing while eliminating the friction between the surfaces to add new functions that the like cannot perform.

1 Claim, 5 Drawing Sheets

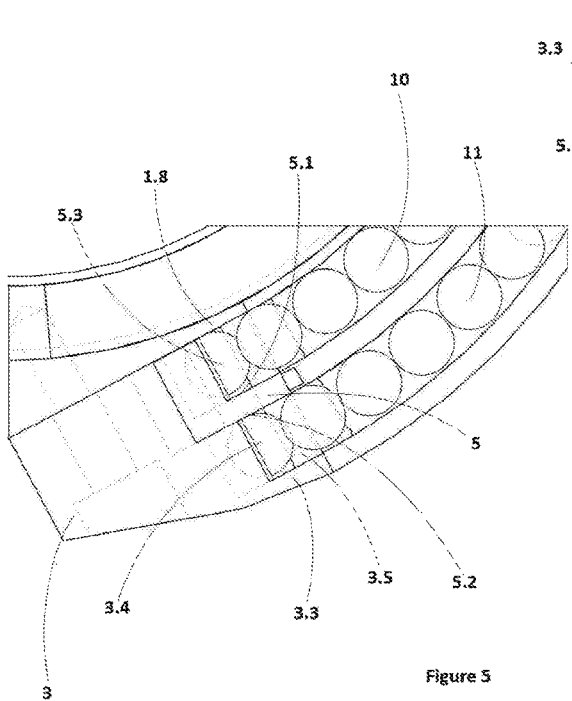
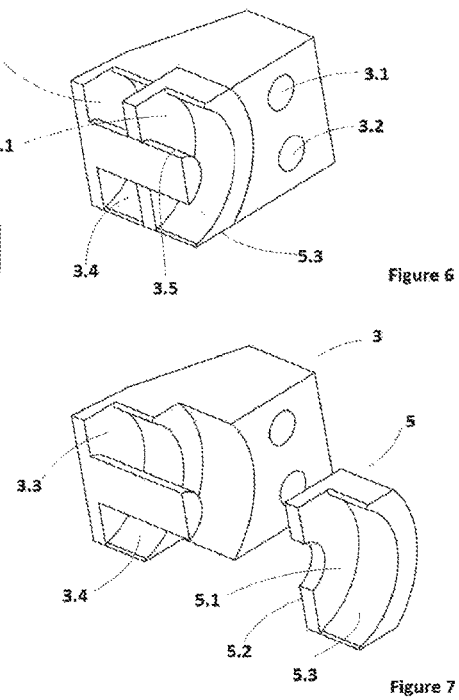
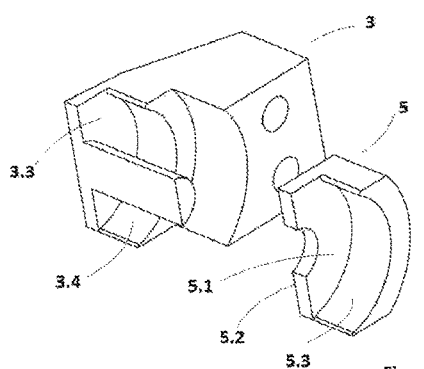
Figure 5
Figure 6
Figure 7

FIXING AND ACTUATING MECHANISM WITH SPIRAL BALL CHANNEL

This present application claims priority under 35 U.S.C. § 365 to International Application No. PCT/TR2013/000374, filed on Dec. 6, 2013, the entire contents of which are incorporated herein by reference.

TECHNICAL FIELD

The present invention is related to a fixing and actuating mechanism with a spiral ball channel which is designed as the square and trapezoidal screws or rectangular or particularly coiled springs in different shapes which are produced in the sensitivity that can work in the system to perform the function of converting rotational movement to linear movement similar to the relationship of a screw and squarenut and is performing while eliminating the friction between the surfaces to add new functions that the like cannot perform.

DEFINITION OF THE INVENTION

The present invention is related to a fixing and actuating mechanism which is designed to provide the function of the ball screw by which the rotational movement is converted into linear movement or of the main shaft part of spiralift mechanism that is activated by using the same motion and to add new functions that similar mechanisms cannot provide.

When we analyze the advantages provided by the present two mechanisms separately, the differences are as follows.

The advantages and differences provided according to ball screw mechanisms;

a) To carry out the feeding back operation of balls in line and space and during this operation, the screw shaft surface is not used.

b) Non-use of screw or spring surfaces while carrying out the feedback operation of balls and thus elimination of cellular structure that is needed in the feedback which is carried out on the screw surface and in line and space in similar systems, availability of preloading of carrier surfaces of the screw and prevention of backlash.

c) Non-use of screw surface during feedback operation of balls in line and space and by this meansavailability to design screw shape separately from ball feedback necessities and opportunity of independent, 4 ball cycles operate on 2 carrier surfaces of one screw thread in single cycle.

d) Non-use of screw surface during feedback operation of balls in line and space and by this means the balls in the space are not exposed to drive on the screw shaft and in the reverse direction of rotation and thus a reduction of wear on the ball.

e) Carrying out the preloading of the system in two directions and 4 different ball cycles on a screw thread profile in a single cycle.

f) Non-use of screw surface during feedback operation of balls in line and space and by this means it can operate particularly oncoiled springs except for a screw thread surface.

The advantages provided according to the spiralift main shaft mechanism.

a) Parts, which are suitable for mass production have been produced in the system of the invention.

b) Working under bidirectional load (tensile, compression load) has been provided.

c) The costs are rather high because of comprising of numbers of eccentric bearing in eccentric bearing main shaft part. In the mechanism mentioned in the invention, the working manner with eccentric bearing has been removed, mounting pieces have been reduced, and the costs have been reduced considerably.

d) Mounting of eccentric bearings on the main part is time consuming and troublesome in terms of production. By means of the mechanisms mentioned in the invention, these operations have been accelerated.

e) Compared to the present mechanism, the developed mechanism applies pressure on much more points of the spiral band and this pressure is applied equally on two carrier surfaces of the band. By this means, the mechanism becomes more stable and durable. This feature prolongs the life of the mechanism and enhances working capability.

PARTS AND PIECES COMPRISED IN THE INVENTION

1. Spiral nut part A
   1.1. Nut thread
   1.2. Carrier inner ball channel
   1.3. Carrier outer ball channel
   1.4. Inner ball feedback channel
   1.5. Outer ball feedback channel
   1.6. Upper feedback mounting support surface
   1.7. Upper feedback part mounting and inner ball cycle support surface
   1.8. Lower feedback part mounting and inner ball cycle support surface
   1.9. Upper feedback screw hole 1
   1.10. Upper feedback screw hole 2
   1.11. Lower feedback screw hole 1
   1.12. Lower feedback screw hole 2
   1.13. Mounting space on screw shaft
   1.14. Screw shaft
   1.15. Screw hole
   1.16. Pin hole
2. Spiral nut part B
3. Lower feedback rotation part
   3.1. Lower feedback part screw space 1
   3.2. Lower feedback part screw space 2
   3.3. Lower feedback part inner ball cycle rotation support surface
   3.4. Lower feedback part inner ball cycle rotation surface
   3.5. Rotation support surface
4. Upper feedback rotation part
5. Lower feedback channel separation pin
   5.1. Lower feedback channel separation pin inner ball cycle support surface
   5.2. Lower feedback channel separation pin outer ball cycle support surface
   5.3. Lower feedback channel separation pin inner ball cycle rotation surface
6. Upper feedback channel separation pin
7. Spiral nut part A feedback channel cover
8. Spiral nut part B feedback channel cover
9. Mounting shaft
10. Inner ball cycle
11. Outer ball cycle
12. Ball cycle feedback operation rotation region 1
13. Ball cycle feedback operation rotation region 2

14. Particularly coiled spring
   14.1. Carrier surface-1
   14.2. Carrier surface-2
15. Line and its space

THE OPERATION MANNER OF THE SYSTEM ACCORDING TO THE INVENTION IS AS FOLLOWS

Figure 1:
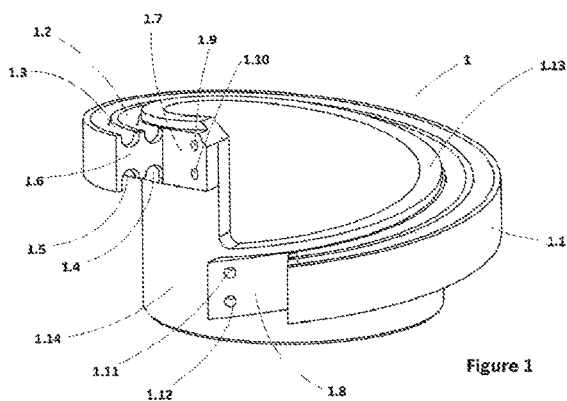
FIG. 1. Perspective view of the spiral nut part of the mechanism according to the invention FIG. 2. Plan view of mounted, spiral nut part of the mechanism according to the invention FIG. 3. Front view of spiral nut part of the mechanism according to the invention FIG. 4. Plan view of the spiral nut part of the mechanism according to the invention FIG. 5. Mount view of the nut part, lower feedback rotation part and lower feedback channel separation pin of the mechanism according to the invention FIG. 6. Mount view of the lower feedback rotation part and lower feedback channel separation pin of the mechanism according to the invention FIG. 7. Demounted view of lower feedback rotation par and lower feedback channel separation pin of the mechanism according to the invention FIG. 8. The view of operation manner on the spring of outer ball cycles act in the mechanism according to the invention FIG. 9. The mounted cutaway view of spiral nut part A, spiral nut part B, mounting shaft and parts of particularly coiled spring parts acting in the mechanism according to the invention FIG. 10. The demounted perspective view of the mechanism according to the invention FIG. 11. The mounted front view of the mechanism according to the invention

It is related to an innovative nut mechanism which performs different features compared to similar ones as a result of operations carried out on nut thread (1.1) that is formed by following a helix line having an exact line and space (15) which is of a thread profile of the nut shaft (1.14) and rotating 360 degrees of single cycle on the profile and on the nut shaft (1.14) with this thread profile, as seen in the part in the figure (FIG. 1).

Figure 4:
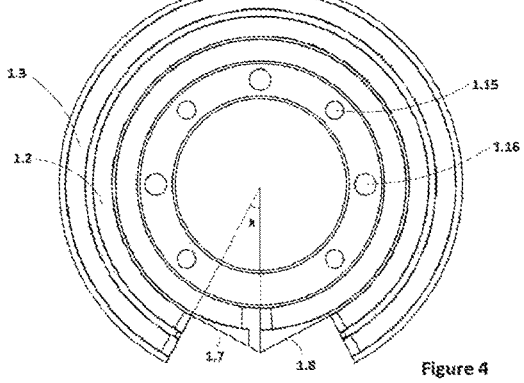

When we look at the surface of this formed thread (1) from the top (FIG. 4), we see that mounting surfaces (1.7), (1.8) have been formed in the initial and end parts of the nut thread (1.1). The main goal of these surfaces is to obtain a smooth surface on which the feedback apparatus (3), (4), (5), (6) can be mounted. Besides, these formed surfaces (1.7), (1.8), when looked at from the top (FIG. 4), it is recorded making an exact x angle to the interception line of initial and end parts of nut thread profile (1.1) and being a tangent to the line of the inner ball channel (1.2) closer to the center.

These surfaces (1.7), (1.8) provide a ball cycle (10) in the inner ball channel (1.2) supported during rotation except for the mounting of feedback apparatus (3), (4) and the pins (5),(6) supporting the rotation of balls.

Each ball cycle is supported from 4 points (3.3), (3.4), (3.5), (5.2) during feedback (FIG. 5).

The formation of surfaces which will support balls during feedback operation that two screw cycles (10), (11) operating separately on the screw thread carrier surface (14.1), (14.2) in screw line and space (15) are regained to the system is as follows (FIG. 5).

The balls in the inner ball cycle (10) use the feedback part mounting surface (1.8), pinrotation surface (5.3), pinsurface (5.1), and rotation support surface (3.5) (FIG. 5).

The balls in the outer ball cycle (11) use the pin surface (5.2), feedback part rotation surface (3.4) and feedback part support surface (3.5) (FIG. 5).

The formation of these surfaces in the present invention is due to the geometry formed by the mounted parts (FIG. 6), not by a single part.

The channels (1.2), (1.3), (1.4), (1.5) opening to the screw thread are divided into two types. These can be divided as carrier channels (1.2), (1.3) and feedback channels (1.4), (1.5).

The balls finished in carrier channels (1.2), (1.3) are transferred to feedback channels (1.4), (1.5) by means of the feeding part (3) and regained to the system by means of the other feedback part (4).

Figure 2:
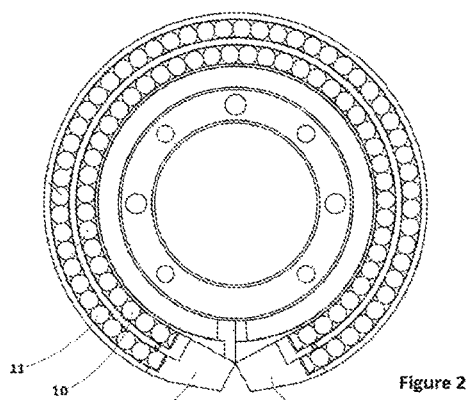
Figure 3:
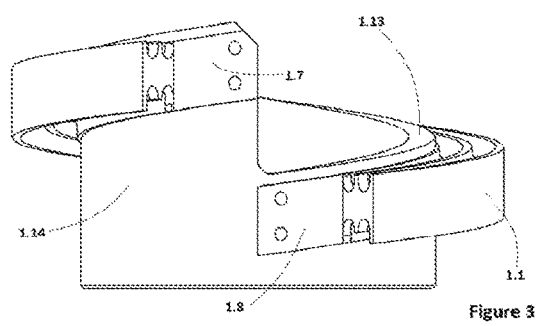

The system finishes this closed cycle ball cycle (10), (11) without completing a single tour (FIG. 2).

Figure 9:
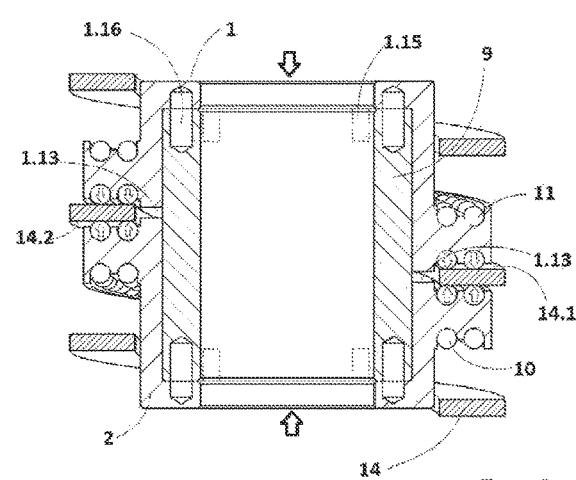
Figure 10:
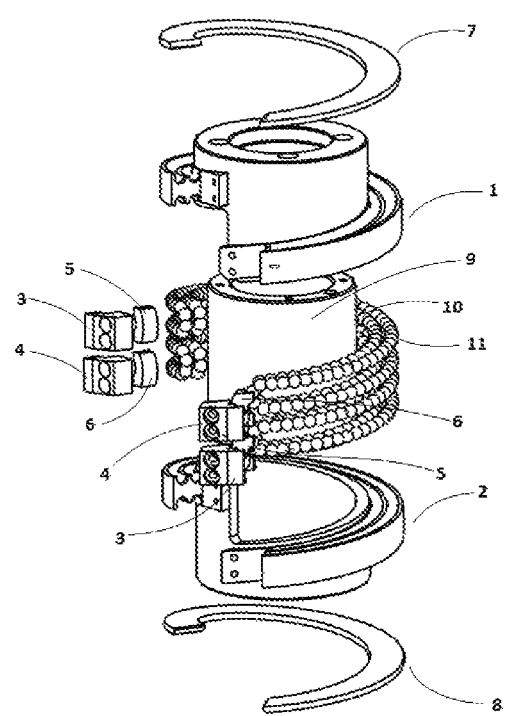
Figure 11:
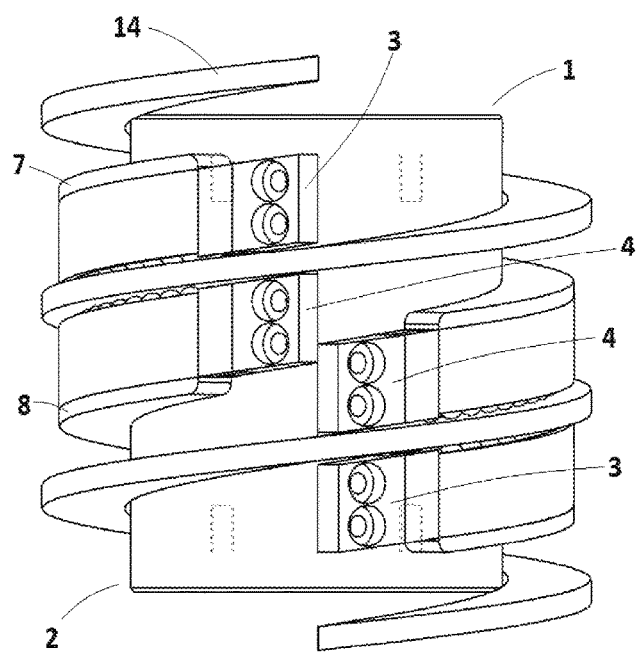

The reason for that is the designed nut part (1) establishes relationship with the screw thread or a single carrier surface (14.1) of the spring (14) and forms a mounting space (1.13) providing to apply pressure symmetrically of a second similar part (2) (FIG. 9).

In order to provide the similar second part to apply pressure symmetrically (FIG. 9), a mounting space (1.13) following the helix line, which forms the nut thread on the nut shaft (1.14) on the nut thread (1.1), is opened.

Due to the other parts (3), (4), (5), (6) which provide for the ball cycle being present in a 360 degree motion and in line and space (15) (FIG. 2), mounting spaces can be opened (1.13) on the nut part (1) and thus the similar two parts can be mounted together in desired sensitivity (FIG. 9).

As a result of mounting similar two parts (1), (2) being mounted to a screw shaft or spring (14), two feedback regions are formed (12), (13), (FIG. 8) which operate in the same line and space (15) and in the reverse directions that cannot be seen in any similar mechanisms.

Figure 8:
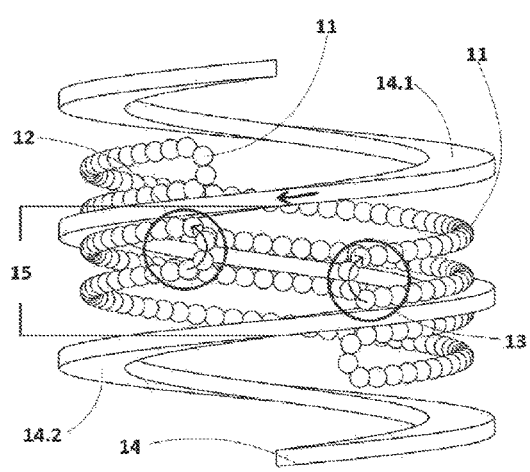

When we look further to these feedback regions (12), (13) (FIG. 8), we see that each ball cycle (11) establishes a relationship with the carrier surface (14.1), (14.2) in 2 different directions of screw shaft or spring (14) in the same line and space (15) independently (FIG. 8).

Due to feeding back without making use of the screw thread or carrier surfaces (14.1), (14.2) of the spring (14), choosing the screw profile as square or trapezoidal and the ball cycles (10), (11) which operate on these surfaces carry out feedback in line and space (15), the use of 2 ball cycles (10), (11) on the same surface is provided, and preloading (FIG. 9) can be applied to these ball cycles. By this means, higher efficiency and sensitivity can be obtained from the surface of the screw or the spring (14.1), (14.2) formed because of this single rotation.

The points of the present invention that can be enhanced

Since the system in the present invention operates the ball cycles of the ball cycles comprised in a different manner from the similar, the use of bobbins instead of balls in the system can be provided by means of the thread geometry and the ball channel number can be increased in the present system.

DISCLOSURE OF THE INVENTION

The spiral nut mechanism is comprised of a spiral nut part A (1), spiral nut part B (2), lower feedback rotation part (3), upper feedback rotation part (4), lower feedback channel separation pin (5), upper feedback channel separation pin (6), spiral nut part A feedback channel cover (7), spiral nut part B feedback channel cover (8) and mounting shaft (9) parts.

The duties of the parts and pieces of the product according to the invention are as follows.

Spiral nut part A (1): The duty of this part is to comprise 2 closed cycles ball cycles (10), (11) that can work on the spring (14) that it operates on or on either one of the carrier surfaces of the screw thread (14.1), (14.2).

At the same time, it is to provide the feedback operations without using the surface of the screw or the spring (14.1) in the line and space and to form the necessary mounting spaces (1.13) in order to mount with a second similar par part on the nut shaft (1.14).

For this reason, ball channels (1.2), (1.3) and ball feedback channels (1.4), (1.5) providing ball feedback operations (12),(13) are present on the nut thread. Besides, from the initial and end regions of the nut thread (1.1), mounting support surfaces (1.6), (1.7), (1.8) of the feedback parts and screw holes (1.9), (1.10), (1.11), (1.12) have been formed.

Spiral nut part B (2): The duty of this part is to comprise 2 closed ball cycles (10), (11) that can work on the spring (14) that it operates on or on either one of the carrier surfaces of the screw thread (14.1), (14.2).

At the same time, it is to provide the feedback operations without using the surface of the screw or the spring (14.1) in the line and space and to form the necessary mounting spaces (1.13) in order to mount with a second similar par part on the nut shaft (1.14).

For this reason, ball channels (1.2), (1.3) and ball feedback channels (1.4), (1.5) providing ball feedback operations (12),(13) are present on the nut thread. Besides, from the initial and end regions of the nut thread (1.1), mounting support surfaces (1.6), (1.7), (1.8) of the feedback parts and screw holes (1.9), (1.10), (1.11), (1.12) have been formed.

Lower feedback rotation part (3): the duty of this part is to provide the separate transfer of balls comprised in the carrier and feedback channels (1.2), (1.3), (1.4), (1.5) on the nut thread (1.1) during feedback operation (12),(13). Part (3) provides the support of the balls in the channel from 8 points with the other part (5) that the balls operate together.

Upper feedback rotation part (4): the duty of this part is to provide the separate transfer of balls comprised in the carrier and feedback channels (1.2), (1.3), (1.4), (1.5) on the nut thread (1.1) during feedback operation (12),(13). Part (4) provides the support of the balls in the channel from 8 points with the other part (6) that the balls operate together.

Lower feedback separation pin (5): the duty of this part is to provide the separation of the balls from each other in the feedback rotation region (12), (13) and to form auxiliary surfaces (5.1), (5.2), (5.3) for rotation of the balls.

Upper feedback separation pin (6): the duty of this part is to provide the separation of the balls from each other in the feedback rotation region (12), (13) and to form auxiliary surfaces for rotation of the balls.

Spiral nut part A feedback channel cover (7): the duty of this part is to form a closed chamber for the balls in the fed back channel.

Spiral nut part B feedback channel cover (8): the duty of this part is to form a closed chamber for the balls in the fed back channel.

Mounting shaft (9): the duty of this part is to provide the mounting of the two similar parts (1), (2) in the desired measure and sensitivity.

Inner ball cycle (10): the view of the balls operating in the inner ball channel Outer ball cycle (11): the view of the balls operating in the outer ball channel Ball cycle rotation region 1(12): the region where the balls are transferred between the channels Ball cycle rotation region 2 (13): the region where the balls are transferred between the channels Particularly coiled spring (14): the spring that the mechanism operates with and the carrier surfaces (14.1), (14.2) within two different directions Line and space (15): the line and the space of the spring that the mechanism operates with The mounting of the mechanism according to the invention is as follows The lower feedback separation pin (5) is placed into the lower feedback rotation part (3) and two parts are mounted to the mounting and inner ball cycle supporting surface (1.8) of the spiral nut part A (1) by using the lower feedback screw hole 1 (1.11) and lower feedback screw hole 2 (1.12).

The lower feedback separation pin (6) is placed into upper feedback rotation part and two parts are mounted to the mounting inner ball cycle supporting surface (1.7) of the spiral nut part A (1) by using upper feedback screw hole 1 (1.9) and upper feedback screw hole 2 (1.10).

Thus the mounting of the spiral nut part A (1) is completed.

After the spiral nut part B (2) which is similar to this is mounted with similar parts (3), (4), (5), (6), the spiral nut part A feedback cover (7) and spiral nut part B feedback cover (8) covers the top of the feedback channels (1.4), (1.5) by screwing or gluing.

These prepared two parts (1), (2) are aligned to each other by using mounting shaft (9) and pinhole (1.16) and are mounted to each other and thus the complete system is mounted.

The invention claimed is:
1. A fixing and actuating mechanism comprising:
   a mounting shaft;
   a circular spring helical raceway formed around the shaft;
   an inner ball cycle and an outer ball cycle, wherein the inner ball cycle and the outer ball cycle extend around the shaft and work on the spring helical raceway;
   a ball cycle rotation region in which balls traveling in channels formed in the inner and outer ball cycles are transferred between channels;
   a feedback channel cover;
   upper and lower feedback rotation parts;
   upper and lower feedback separation pins mounted to the upper and lower feedback rotation parts, respectively, for providing separation of balls in a feedback region, wherein the upper and lower feedback separation pins include a curved auxiliary surface facing opposite to a rotation support surface.

* * * * *